(12) United States Patent
Amminudin et al.

(10) Patent No.: US 9,092,124 B2
(45) Date of Patent: Jul. 28, 2015

(54) SYSTEM AND METHOD FOR EFFECTIVE PLANT PERFORMANCE MONITORING IN GAS OIL SEPARATION PLANT (GOSP)

(71) Applicant: Saudi Arabian Oil Company, Dhahran (SA)

(72) Inventors: Kamarul A Amminudin, Dhahran (SA); Mohammed T. AbdulMohsin, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 196 days.

(21) Appl. No.: 13/945,140

(22) Filed: Jul. 18, 2013

(65) Prior Publication Data

US 2014/0026085 A1    Jan. 23, 2014

Related U.S. Application Data

(60) Provisional application No. 61/673,568, filed on Jul. 19, 2012.

(51) Int. Cl.
| | | |
|---|---|---|
| *G06F 3/0481* | (2013.01) | |
| *G06F 3/0484* | (2013.01) | |
| *G06Q 10/06* | (2012.01) | |
| *G06Q 50/06* | (2012.01) | |
| *G05B 13/04* | (2006.01) | |

(52) U.S. Cl.
CPC .......... *G06F 3/04842* (2013.01); *G05B 13/044* (2013.01); *G06Q 10/06* (2013.01); *G06Q 50/06* (2013.01)

(58) Field of Classification Search
CPC .................................................. G06F 3/04842
USPC ........................................................ 715/764
See application file for complete search history.

(56) References Cited

U.S. PATENT DOCUMENTS

| | | | |
|---|---|---|---|
| 5,132,918 | A | 7/1992 | Funk |
| 6,298,454 | B1 | 10/2001 | Schleiss et al. |
| 6,442,513 | B1 | 8/2002 | Cheng et al. |
| 6,754,673 | B2 | 6/2004 | Horn et al. |
| 6,772,082 | B2 | 8/2004 | Van Der Geest et al. |
| 6,795,798 | B2 | 9/2004 | Eryurek et al. |
| 7,346,404 | B2 | 3/2008 | Eryurek et al. |
| 7,522,963 | B2 | 4/2009 | Boyden et al. |

(Continued)

FOREIGN PATENT DOCUMENTS

EP    2161406 A1    3/2010

OTHER PUBLICATIONS

Alguindigue, Ph.D., I. E. and Branko, Ph.D., P., Asset Management Solutions and Plant Reliability, Fisher-Rosemount and PiCom, Ltd.

(Continued)

*Primary Examiner* — William Titcomb
(74) *Attorney, Agent, or Firm* — Bracewell & Giuliani LLP; Constance Gall Rhebergen; Brad Y. Chin

(57) ABSTRACT

The invention provides a facility monitoring system and method of using the system that allows for prioritization of performance parameters to be improved based on deviations from target performance parameters. Improvement incentives are provided to users on a user interface such that the user appreciates the value of the improvement to be conducted.

20 Claims, 11 Drawing Sheets

(56) References Cited

U.S. PATENT DOCUMENTS

| | | |
|---|---|---|
| 8,095,227 B2 | 1/2012 | Ydstie |
| 8,340,789 B2 | 12/2012 | Wintrich et al. |
| 8,352,049 B2 | 1/2013 | Hsiung et al. |
| 2005/0040026 A1 | 2/2005 | Grub et al. |
| 2006/0043004 A1 | 3/2006 | Rose et al. |
| 2006/0085174 A1 | 4/2006 | Hemanthkumar et al. |
| 2007/0275471 A1 | 11/2007 | Coward |
| 2009/0054998 A1 | 2/2009 | Beerbaum |
| 2010/0023269 A1 | 1/2010 | Yusti et al. |
| 2013/0026082 A1 | 1/2013 | Al-Shafel et al. |
| 2013/0046396 A1 | 2/2013 | Blevins et al. |

OTHER PUBLICATIONS

Davis, Jr., J. L., et al., Integrating Process Unit Energy Metrics Into Plant Energy Management Systems, 27th Industrial Energy Technology Conference, New Orleans, LA., May 10-13, 2005, pp. 1-8, KBC Advanced Technologies, Inc., Houston, Texas.

Shokri, S., et al., Real Time Optimization as a Tool for Increasing Petroleum Refineries Profits, Petroleum & Coal., Apr. 15, 2009, pp. 110-114, vol. 51 (2), www.vurup.sk/pc.

PCT Inernational Search Report and th written opinion dated Mar. 28, 2014; International Application No. PCT/US2013/50996.

WORK FLOW AND SYSTEM DIAGRAM

Energy Consumption Hierarchical chart

WORK FLOW AND SYSTEM DIAGRAM – development of the diagnostic tips

Figure 9

Khurais Process Improvement Initiatives Summary for 06/30/12

Click Here for detailed KHPOD Engineering KPIs Dashboard

Khurais Producing Operations Division - Important Key Performance Indices

| Description | Value | Incentive Target | Opportunity Unit | Description | Value | Incentive Target | Opportunity Unit |
|---|---|---|---|---|---|---|---|
| B32-Crude Yield Gain Incentives | 255.41 | 255.42 | -0.02 MBD | GT2-NGL Yield Gain | 53.68 | 53.52 | -0.15 MBD |
| B33-Crude Yield Gain Incentives | 247.30 | 247.34 | -0.04 MBD | Khurais Power Saving Incentive | | | 9.15 $MM/Year |
| B34-Crude Yield Gain Incentives | 295.25 | 295.26 | -0.01 MBD | Khurais Fuel Gas Saving Incentive | | | 36.35 $MM/Year |
| B35-Crude Yield Gain Incentives | 244.00 | 244.07 | -0.07 MBD | Energy Performance Index | 43.63 | 37.00 | 6.63 MMBtu/1000 BOE |
| GT1-NGL Yield Gain | 53.77 | 53.52 | -0.22 MBD | No. Oil Trains in Operation | 4.00 | 4.00 | 0.00 - |

Khurais Producing Operations Division - Value Creation Opportunities (Top to Least Priority) for 06/30/12

| Description | Area | Optimization Incentive | Gap Closure Diagnostic Tips |
|---|---|---|---|
| Total Fuel Consumption | Utilities | ENERGY | 1. Maximize individual gas turbine load possible to avoid running additional gas turbine unnecessarily<br>2. Ensure individual gas turbine performance is optimized and ensure minimum fuel usage for boiler.<br>3. Cross check performance against the recommended vendor practices<br>4. Cross check the amount of fuel gas used for other misc. usage, such as to maintain dome at the dare tip, hot standby boilers, and others. |
| B85- G0201 Power Usage | Oil | ENERGY | 1. Check the process performance against the corresponding pump performance curve<br>2. Review number of pumps running □Exploit individual pump capacity to the maximum (full load)<br>3. Review discharge pressure requirement<br>4. Check for possible equipment deteriorating performance (e.g seal leakage, vibration or maintenance record) |
| Condensate Rec. Factor | Utilities | RESOURCE | 1. Focus on minimizing demin water make-up consumption for the steam system (Note: Engineering is to assess the possibility of installing a dedicated flowmeter for the demin water make-up stream)<br>2. Check the performance of the steam traps □Closure no leaking and perform regular Dith check□r the traps<br>3. Conduct housekeeping surrounding the steam system area to ensure no steam leaks and no condensate being drained away unnecessarily<br>4. Resolve possible back pressure issue from the condensate main header (Note: Engineering assessment is required). This back pressure restricts the condensate drainage to the condensate recovery system which then causes condensate back-up in the reboiler. To alleviate this problem is by allowing the condensate to be drained freely to the sewer. And this incurs huge loss of high value steam condensate<br>5. Conduct housekeeping at the oil and gas train area where steam is being used (e.g. reboiler area) to check whether any leaks or condensate being drained away unnecessarily<br>6. Assess possibility of avoiding hot condensate being mixed with cold condensate, if any.<br>7. Optimize deaerator vent rate to minimize steam loss |
| B33- G0201 Power Usage | Oil | ENERGY | 1. Check the process performance against the corresponding pump performance curve |

# SYSTEM AND METHOD FOR EFFECTIVE PLANT PERFORMANCE MONITORING IN GAS OIL SEPARATION PLANT (GOSP)

The present application relates to, claims the benefit of, and claims priority to U.S. Provisional Patent Application Ser. No. 61/673,568, filed Jul. 19, 2012, titled "System and Method for Effective Plant Performance in Gas Oil Separation Plant (GOSP)," and which is incorporated herein in its entirety.

FIELD OF THE INVENTION

This invention generally relates to the development and deployment of a plant performance monitoring tool that enables operators, engineers, and others in gas oil separation plant (GOSP) facilities to monitor, assess, and troubleshoot plant operation effectively.

BACKGROUND OF THE INVENTION

With the rapid deployment of data acquisition technology throughout the oil and gas industries, it is becoming common for oil and gas facilities to be well equipped with plant distributed control systems, data historian (e.g., PI system), and performance monitoring tools.

Plant performance monitoring takes many forms in the industry. Commercial products exist that allow general monitoring capabilities, for example, focused on controller performance. Another set of tools focus on, or are tailored toward, energy optimization efforts only. However, there is a lack of monitoring tools that allow for monitoring a more extensive variety of information, such as equipment efficiency, yield, utilities, and process, as well as resource optimization, to allow for the optimization of factors relevant to the operations of a facility. Additionally, there is a lack of monitoring tools that are designed for a GOSP facility.

Currently, GOSP facilities rely on typical process monitoring tools, like data historian PI systems, and manual calculations, to monitor performance. There exists a system that incorporates KPIs and is mainly used to compare between actual performance and the KPI performance. However, this system is mainly limited to simple performance parameters, such as temperature and flow rate monitoring. If a detailed performance parameter monitoring is required, such as to monitor compressor polytrophic efficiency, such an analysis is time consuming and takes several hours to complete. This time consuming effort is not productive unless the effort is automated and integrated. Thus, there is a need in the industry for improved monitoring tools.

SUMMARY

In one aspect, the invention provides a GOSP facility monitoring system to assess deviations from key performance indicators by comparing actual performance parameters to target performance parameters. The system notifies the user of improvement incentives and diagnostic tips to assist efforts to improve performance parameters. The GOSP facility monitoring system includes one or more client devices, one or more processors, and a non-transitory memory positioned in communication with the one or more processors to store computer program product therein. The system also includes an input/output unit connected to the one or more processors and the non-transitory memory, the input/output unit adapted to be in communication with a plurality of back end operational systems through a network to receive a plurality of performance parameters from the plurality of back end operational systems. The system further includes one or more key performance indicator databases to associate target performance values to operational units. The system also includes a computer program product, defining an aggregator module, stored in the non-transitory memory and operable on the one or more processors, the aggregator module having a set of instructions that, when executed by the one or more processors, cause the GOSP facility monitoring system to perform operations. The operations include determining a plurality of deviations from target performance parameters. The deviations are determined by comparing actual performance parameters to target performance parameters. A list of deviations from target performance parameters is generated. A summary of improvement incentives based on the deviation from a target performance parameter is generated. The improvement incentives can include financial improvement, yield improvement, and resource usage improvement. An user interface is generated to display at one or more client devices. The user interface allows a user to monitor the performance parameters of the GOSP facility. The user interface can include a performance parameters interface, improvement incentive interface, and diagnostic tips interface.

In a further aspect, the invention provides a method of using the facility monitoring system. The method includes a user monitoring the user interface. The user interface displays an improvement opportunity based on a deviation from a target performance parameter. The user interface also displays diagnostic tips to assist in the reduction of the deviation from the target performance parameter.

In another aspect, the invention provides a computer storage medium having a computer program stored therein including a set of instructions that when executed by one or more processors cause the one or more processors to perform operations. The operations include determining a plurality of deviations from target performance parameters. The deviations are determined by comparing actual performance parameters to target performance parameters. A list of deviations from target performance parameters is generated. A priority order for the plurality of deviations from target performance parameters is generated. A summary of improvement incentives based on the deviations from target performance parameters is generated. The improvement incentives can include financial improvement, yield improvement, and resource usage improvement. An user interface is generated to display at one or more client devices. The user interface allows a user to monitor the performance parameters of the GOSP facility. A list of diagnostic tips for addressing the deviations from target performance parameters in the determined priority order is also generated.

BRIEF DESCRIPTION OF DRAWINGS

FIG. 9 shows an exemplary screen shot of a user interface according to an embodiment, detailing overall performance summary on a given day for an exemplary GOSP facility.

DETAILED DESCRIPTION OF THE INVENTION

Figure 1:
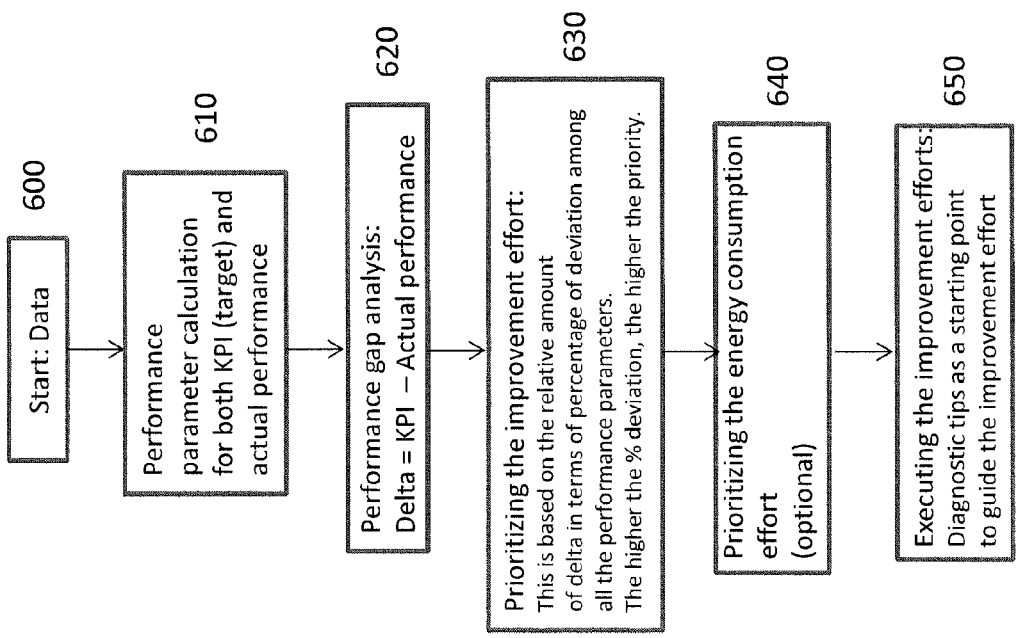
FIG. 1 shows a work flow and system diagram according to an embodiment of this invention.

Although the following detailed description contains many specific details for purposes of illustration, it is understood that one of ordinary skill in the art will appreciate that many examples, variations, and alterations to the following details are within the scope and spirit of the invention. Accordingly, the exemplary embodiments of the invention described herein and provided in the appended figures are set forth without any loss of generality, and without imposing limitations, on the claimed invention.

In one aspect, the invention provides a GOSP facility monitoring system to assess deviation from key performance indicators by comparing actual performance parameters to target performance parameters. The system notifies the user of improvement incentives and diagnostic tips to improve performance parameters. The GOSP facility monitoring system includes one or more client devices, one or more processors, and a non-transitory memory positioned in communication with the one or more processors to store computer program product therein. The system also includes an input/output unit connected to the one or more processors and the non-transitory memory, the input/output unit adapted to be in communication with a plurality of back end operational systems through a network to receive a plurality of performance parameters from the plurality of back end operational systems. The system further includes one or more key performance indicator databases to associate target performance values to operational units. The system also includes a computer program product, defining an aggregator module, stored in the non-transitory memory and operable on the one or more processors, the aggregator module having a set of instructions that, when executed by the one or more processors, cause the GOSP facility monitoring system to perform operations. The operations include determining a plurality of deviations from target performance parameters. The deviations are determined by comparing actual performance parameters to target performance parameters. A list of deviations from target performance parameters is generated. A summary of improvement incentives based on the deviation from a target performance parameter is generated. The improvement incentives can include financial improvement, yield improvement, and resource usage improvement. An user interface is generated to display at one or more client devices. The user interface allows a user to monitor the performance parameters of the GOSP facility. The user interface can include a performance parameters interface, improvement incentive interface, and diagnostic tips interface.

In further embodiments, the user interface allows the selection of a performance parameter to be improved and generates a display of the financial improvement to be gained by improving the performance parameter to be improved. In other embodiments, the user interface allows the selection of a performance parameter to be improved and generates a display of the yield improvement to be gained by improving the performance parameter to be improved. In other embodiments, the user interface allows the selection of a performance parameter to be improved and generates a display of the resource usage improvement to be gained by improving the performance parameter to be improved.

In some embodiments, the plurality of deviations from target performance parameters are determined based on a percentage deviation. In yet further embodiments, the plurality of deviations from target performance parameters are ranked in a priority order. The priority order can be any number of priorities as selected by the user. Exemplary priority orders can be based on percentage deviation from the target performance parameter, the financial improvement to be gained by reducing or eliminating the deviation from target performance parameter, the yield improvement to be gained by reducing or eliminating the deviation from target performance parameter, or the resource usage improvement to be gained by reducing or eliminating the deviation from target performance parameter.

In further embodiments, the user interface allows the selection of a performance parameter to be improved and generates a list of diagnostic tips to aid the user in improving the performance parameter to be improved.

In a further aspect, the invention provides a method of using the facility monitoring system. The method includes a user monitoring the user interface. The user interface displays an improvement opportunity based on a deviation from a target performance parameter. The user interface also displays diagnostic tips to reduce or eliminate the deviation from the target performance parameter.

In further embodiments, the user takes action based on the diagnostic tips provided and reduces or eliminates the deviation from a target performance parameter. In some embodiments, the user interface displays an improvement incentive in terms of financial gain, yield gain, or resource usage optimization. In other embodiments, the user interface displays a plurality of improvement opportunities based on deviations from target performance parameters and also displays a priority list of parameters for the user to address based on a priority order of the improvement opportunities based on percentage deviations from target performance parameters.

In another aspect, the invention provides a computer storage medium having a computer program stored therein including a set of instructions that, when executed by one or more processors, cause the one or more processors to perform operations. The operations include determining a plurality of deviations from target performance parameters. The deviations are determined by comparing actual performance parameters to target performance parameters. A list of deviations from target performance parameters is generated. A priority order for the plurality of deviations from target performance parameters is generated. A summary of improvement incentives based on the deviations from target performance parameters is generated. The improvement incentives can include financial improvement, yield improvement, and resource usage improvement. A user interface is generated to display at one or more client devices. The user interface allows a user to monitor the performance parameters of the GOSP facility. A list of diagnostic tips for addressing the deviations from target performance parameters in the determined priority order is also generated.

In yet further embodiments, the plurality of deviations from target performance parameters are ranked in a priority order. The priority order can be based on any number of priorities as selected by the user. Exemplary priority orders can be based on percentage deviation from the target performance parameter, the financial improvement to be gained by reducing or eliminating the deviation from target performance parameter, the yield improvement to be gained by reducing or eliminating the deviation from target performance parameter, or the resource usage improvement to be gained by reducing or eliminating the deviation from target performance parameter.

The monitoring system described can be used in any number of petroleum processing facilities. In an exemplary embodiment, the facility being monitored is a GOSP facility.

When crude oil is produced from an oil well, it primarily contains water and hydrocarbon mixtures that need to be separated. The oil is taken to a GOSP facility where the separation process occurs between the unwanted byproduct (water) and the main products (oil and associated gas). Typically, a GOSP facility has two or three oil-gas separation stages and two- or three-stage dehydrator stages. As the crude oil is sent through the separation system, its pressure is reduced at each stage, and the associated gas is released in a separator. The associated gas is then compressed before it is sent to the gas train facility for further processing. The crude is then processed in the stabilization plant where the light end components in the crude and hydrogen sulfide are removed before this stabilized crude is exported. As for the water, this byproduct is normally pumped to the water handling facility within GOSP facility for additional treatment. Many GOSP facilities then pump the water back to the reservoir for pressure maintenance programs.

GOSP facilities typically consist of an oil train facility, a gas train facility, and utility system. The oil train facility includes a High Pressure Production Trap ("HPPT"), Low Pressure Production Trap ("LPPT"), Water Oil Separation ("WOSEP"), desalting and dehydration operations, stabilization operations, compressors, pumps, and heat exchangers. The gas train facility, or Hydrocarbon Dew Point Control facility, includes propane chillers, TEG dehydration system, and a condensate stripper. The utility system includes a steam system having boilers, HRSGs, and power.

In another aspect, the invention relates to the development and deployment of a plant performance monitoring tool or system that enables users in GOSP facilities to monitor, assess, and troubleshoot plant operations effectively from a desktop. The automated monitoring tool, or system, is developed to monitor specific plant performance parameters in relation to their corresponding performance KPIs, or target performance parameter, and equipped with a capability to perform gap analysis that quantifies the gap between the actual performance and the KPI. This gap analysis provides measuring capability that determines the incentives for gap closure or improvement efforts in terms of such factors as financial values, energy utilization, and resource usage. Following the gap analysis, where the gap closure effort is quantified, the invention provides advisory capabilities through its diagnostic tip features to help users as a starting point to investigate and to troubleshoot process operations. In some embodiments, the invention also provides the capability to prioritize the gap closure or process improvement efforts based on the values of the gap closure analysis of the individual performance parameters. In some embodiments, this invention enhances the productivity of the users as it allows the users to monitor from their client devices which improvement efforts should be focused on and, at the same time, decide whether or not such incentives are worth pursuing. In some embodiments, an analytical engineering dashboard, or user interface, for the performance monitoring tool provides a diagnostic tips interface which is intended to suggest to the users starting points to perform any needed troubleshooting. For inexperienced users, this diagnostic tips advisory feature acts as a training tool and facilitates knowledge transfer. Prioritization of specifically identified improvements or initiatives can be assigned within the monitoring system to further clarify to users expected actions. In some embodiments, the monitoring system of the invention provides the diagnostic tips to the users to initiate action based on the identified improvement effort.

Data Acquisition

As shown in FIG. 1, which is a work flow and system diagram according to an embodiment of the invention, the process begins with data acquisition 600. At data acquisition step 600, relevant process performance data from a GOSP facility are retrieved from the back-end operational systems, such as conventional plant data systems that include, for example, PI, PMS and LIMS (lab analysis data). Some data must go through additional calculations, while some raw data will be in easily usable form. For example, data can be collected from an existing PI system. In a specific example, such as wash water consumption for desalting operations in a GOSP facility, raw data can be collected from the actual wash water flow rate and converted into a specific consumption ratio, a calculated parameter, in an embodiment of system of the invention. In other KPIs, the system simply reads out from PI to be displayed in the monitoring tool. For example, power consumption from a given pump is derived from PI directly and then it is compared with its corresponding KPI.

The data acquired in data acquisition step 600 is then used in performance parameter calculation step 610. In performance parameter calculation step 610, actual performance parameters and target performance parameters, or KPI, of key process equipment are calculated. In the case of actual performance data, these are typically derived from the plant data systems, such as PI or LIMS data. However, as noted above, in several cases, actual performance data go through detailed calculations. Other examples of such performance parameters that require detailed calculations include heat exchangers UA parameters and compressor polytrophic efficiency parameters.

In the case of target performance parameters, formulae created for KPI are based on the regression analysis of the individual unit performance with respect to GOSP facility production rates using process simulation and detail performance curves. Parameters where corresponding formula are developed based on this approach include: power consumption KPIs for compressors and pumps (oil and gas trains), wash water and demulsifier consumption ratio, steam consumption KPI in oil stabilizer reboiler and gas train stripper reboiler, compressor polytrophic efficiency KPI (oil and gas trains), UA KPI for heat exchangers, KPI correlations between H2S composition and crude yield, TEG performance monitoring covering moisture content in dried gas, TEG circulation rate, heating temperature requirement, and TEG losses.

Performance Gap Analysis

Once the actual performance is calculated and the KPI is calculated, performance gap analysis step 620 occurs. The performance gap analysis step 620 highlights the deviation that exists between actual performance and the KPI. Later, this deviation, or delta, serves as an incentive to close the gap. The larger this gap, the bigger the incentive may be for the operation. In critical performance parameters, the performance gap (delta) can be quantified. For example, quantification can occur in monetary values (e.g., values of energy savings), yield gain, or resource usage optimization. In embodiments of this invention, the provision of the diagnostic tips in each of the performance parameters is a starting point to carry out the improvement efforts. The diagnostic tips advisory role feature of some embodiments of the invention helps the users to avoid "shooting in the dark" when a process troubleshooting effort is carried out.

Gap analysis is a way to assess the deviation, or delta, between actual performance parameters and target performance parameters. In embodiments of the invention, depending on specific performance parameters in question, a color coded value of the delta will be highlighted. For example, if the delta is highlighted in red (or other accepted color), the system indicates that the particular performance parameter needs immediate attention to improve. In contrast, if the delta is in green (or other accepted color), immediate attention is not required, i.e., the performance meets or exceeds the target parameters. However, when the delta is green, this is not an indication that the user should be in a complacent mode. The system of the invention provides the user incentives to strive for continuous improvement by outperforming the target, if possible. Additionally, the performance of one factor may be excellent, but at the expense of other related performance KPI.

In addition, the gap analysis provides useful information as to whether the data is suspicious or otherwise. If the delta is too high, it might indicate a possible instrumentation failure or error in data recording, thus alerting the user to pay particular attention to such a potential issue.

Additionally, there exists a possible trade off when the delta is green among certain KPIs. In one specific example of such a trade off, the crude RVP parameter shows a value of 4.7 psia while the KPI is set at 5.7 psia. The delta for such KPI is displayed in green indicating the performance is acceptable. However, if the user clicks on the diagnostic tip box for RVP KPI, it provides tips that show if the actual performance is better than the KPI, then this may impact the crude API specification KPI. This highlights concerns or provides caution on the issue and provides tips to overcome it by lowering the reboiling temperature to raise API. Additionally, when the user looks at the API KPI, the delta is in red indicating that the crude API specification is indeed not met, which indicates that crude value is reduced. Such trade-offs are worth highlighting, as there exist several specifications or KPIs to be met on the same product.

Prioritizing the Improvement

In a prioritizing the improvement effort step 630, prioritization of the gap closure efforts occurs. The number of parameters that need to be monitored is significant in any given facilities and this makes the improvement effort a challenge. To help users in this effort, the invention provides the capabilities to prioritize the gap closure or process improvement efforts. For example, algorithms developed account for the percentage deviation of the individual performance gap and then it is sorted accordingly to highlight the particular improvement efforts that require immediate attention at a given time. The higher the value of this percentage deviation, the higher the priority for the improvement effort to be carried out.

In some embodiments, the plurality of deviations from target performance parameters are determined based on a percentage deviation. In yet further embodiments, the plurality of deviations from target performance parameters are ranked in a priority order. The priority order can be any number of priorities as selected by the user. Exemplary priority orders can be based on percentage deviation from the target performance parameter, the financial improvement to be gained by reducing or eliminating the deviation from target performance parameter, the yield improvement to be gained by reducing or eliminating the deviation from target performance parameter, or the resource usage improvement to be gained by reducing or eliminating the deviation from target performance parameter.

In some embodiments, the invention provides the ability to prioritize all improvement efforts as identified during the gap analysis. Thus, the bigger the gap, the higher the priority. In further embodiments, the prioritizing the improvement step adopts the concept of the 80/20 rule where several selected improvement opportunities (20%) are focused to lead to significant (i.e. 80%) gain or savings.

Incentive Calculations

Incentive calculations are also provided by the system to provide improvement incentives to the user. In some aspects, the invention provides monetary, yield, and resource usage calculations to provide incentive to carry out process improvement or gap closure initiatives. The monetary values are calculated mainly for energy saving efforts in terms of dollars per annum. The financial benefit will provide a driving force to carry out such a process improvement. In this way, the user can gauge how much the system will gain or lose if the system is improved. Other incentive calculations can be made by the system, depending on the user's goals.

Figure 2:
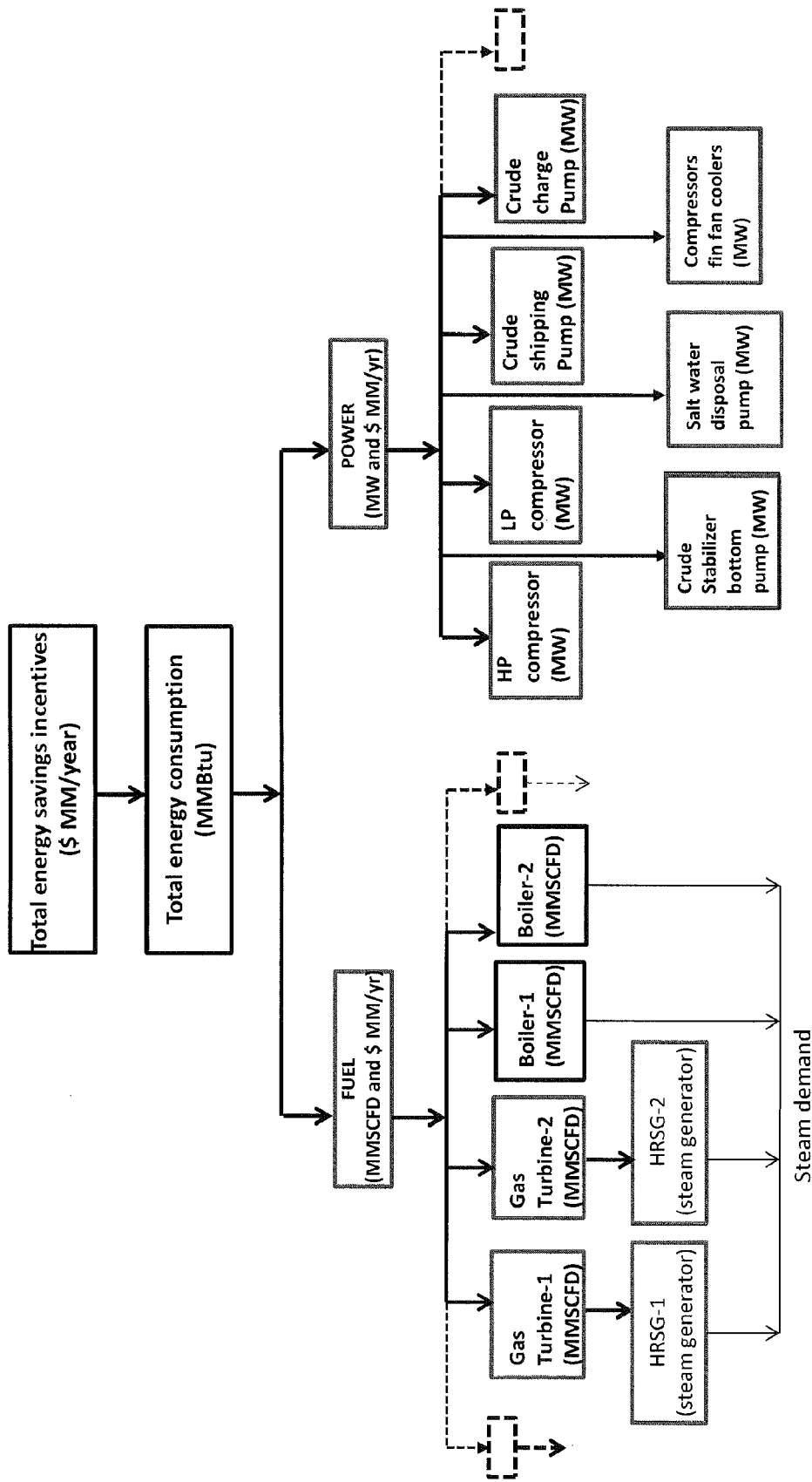
FIG. 2 shows an energy consumption hierarchical chart according to an embodiment of this invention.

In an optional prioritizing energy consumption effort step 640, a second set of priorities focused on reduced energy consumption are assessed to prioritize the gap closure or process improvement efforts. In some embodiments, this step occurs as part of prioritizing the improvement effort step 630. In optional prioritizing energy consumption effort step 640, energy savings initiatives are implemented through an energy consumer chart, as shown in FIG. 2. In FIG. 2, an exemplary hierarchy of energy consumption is shown and is described in detail below.

Creation of Diagnostics Tips

Figure 3:
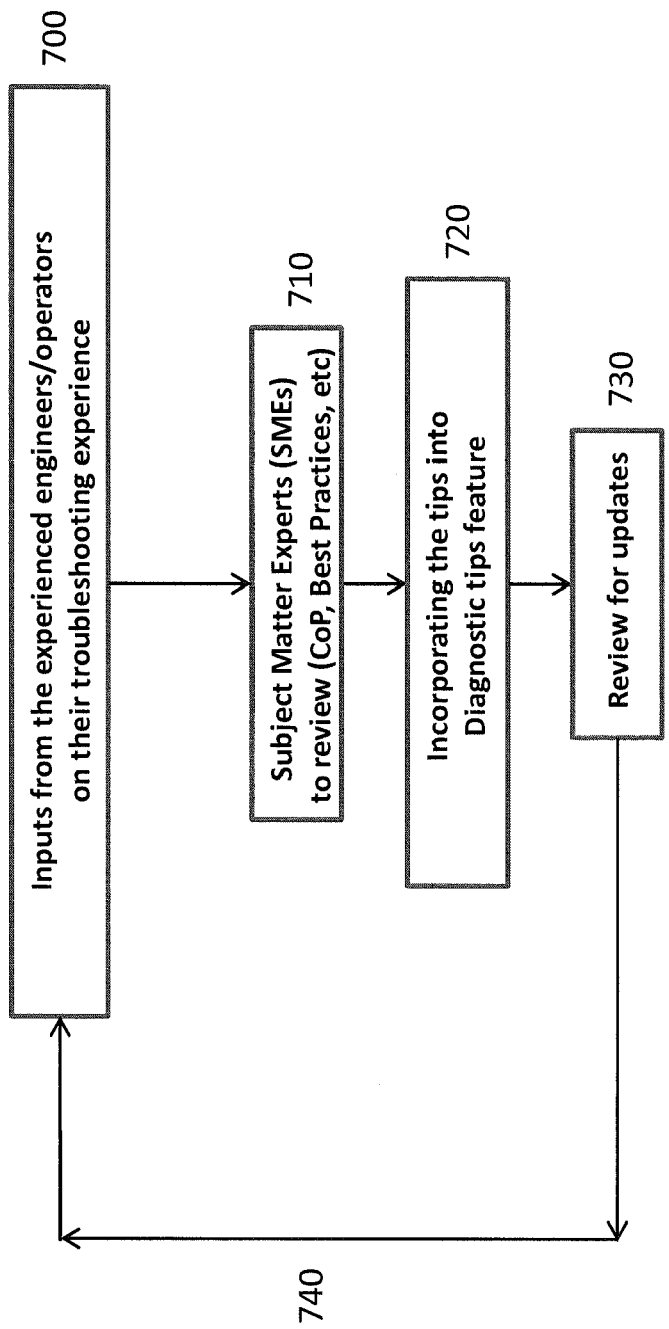
FIG. 3 shows a work flow and system diagram for development of diagnostic tips according to an embodiment of this invention.

A final step of FIG. 1 is executing the improvement efforts 650 and includes diagnostic tips as a starting point to guide the improvement efforts of step 630 and optional step 640. As shown in FIG. 3, diagnostic tips are developed through a series of user implemented steps. In input step 700, experienced users of the system, such as experienced engineers and/or operators input diagnostic tips into the system based on their trouble shooting experience. These diagnostic tips can be specific or general. In review step 710, the diagnostic tools are reviewed by subject matter experts. Review step 710 can include a review for best practices, a review for practicality, a review for accuracy, a review for correctness, a review for compliance with safety, or any other applicable standard. In incorporation step 720, the diagnostic tips are incorporated into the program. In review step 730, a review of the diagnostic tips is conducted. In some instances, the review can ensure compliance with current best practices, a review for practicality in view of updates to the system, a review for accuracy, a review of correctness, a review for compliance with safety, or any other applicable standard. Based on information obtained in step 730, a repeat process 740 can be conducted which includes repeating steps 700, 710, and 720. As shown in FIG. 3, in some embodiments, review step 730 can lead to repeating of steps 700, 710, and 720. In other embodiments, review step 730 is based on repeating of steps 700, 710, and 720.

Diagnostic tips serve as a starting point for carrying out the process improvement effort. There are generally two categories of diagnostic tips: common diagnostic tips that relate to checking for possible instrument failure or malfunction and specific diagnostic tips that are equipment or process performance related. The diagnostic tops are action oriented but should not replace a typical operations manual for the equipment. The diagnostic tips serve as a guide to the user to initiate the improvement effort when the user sees potential for improvement. Exemplary diagnostic tips include: "Maximize individual gas turbine load possible to avoid running additional gas turbine unnecessarily"; "Ensure individual gas turbine performance is optimized and ensure minimum fuel usage for boiler"; "Cross check performance against the recommended vendor practices"; "Cross check the amount of fuel gas used for other miscellaneous usage such as to maintain flame at flare tip, hot standby boilers, and others." The diagnostic tips direct the users perform tasks as an initial step to execute the improvement efforts. In some embodiments, the first word in the diagnostic tip is a verb, so as to emphasize the action oriented tips.

In some embodiments, the diagnostic tips are developed based on the historical actions that were taken by the engineers or plant operators at a given facility. The diagnostic tips are intended to be a starting point, but may not specify details as to particular gap analysis. These diagnostic tips provide the check list of action items for improvement activities to proceed.

In some embodiments, diagnostic tips are specific to individual performance parameters. For instance, when the delta indicates red (or other accepted color) in the gap analysis, the user should click on the particular performance parameter to determine potential improvements that can be made to the system. Diagnostic tips include all possible types of improvement tips based on the operational experience gained by running the facility. The advantage of the diagnostic tips features is that the user can start focusing on improving performance in a systematic manner and remain focused throughout the improvement efforts, based on compiled experiences of others.

In some aspects of the invention, while each performance parameter KPI has its own corresponding diagnostic tips, the KPIs can be classified into various categories, such as energy usage optimization, yield or product gain optimization, resource optimization, and equipment efficiency optimization. The advantage of having such classification is to assist the user to determine the effect of carrying out gap closure or process improvement efforts. For example, the performance parameter of crude stabilization H2S and crude stabilization RVP are both categorized under yield gain optimization. This means any efforts to improve these parameters will affect the yield gain specifically.

Development of Correlations

In some aspects, the invention provides development of correlations to calculate KPIs as a function of production flow rate. Calculations for KPI involve using both equipment performance curves and optimized process simulation. The data can be converted to models via regression analysis. Calculated KPIs from the developed correlations can be tested through a lean square fit approach to determine R squared value for the models' accurateness.

Work Flows and Additional Details

FIG. 2 details an exemplary energy consumption hierarchy. Creation of such a hierarchy enables the user to pinpoint which specific major unit contributes to high energy consumption at a given point in time. Thus, a user can focus on specific energy consumption issues in the operations and identify the root cause of the high energy consumption from an overall system perspective. In some aspects of the invention, more detailed charts are provided that allow the user to see the total energy savings incentives for the facility at a given point in time in terms of monetary values. This value provides incentive to make such an improvement, and if justified, the user can move down to the next layer showing which element of energy consumption, either fuel or power, contributes to the incentives. The user has the ability to see the overall opportunities in energy savings efforts and decides on improvement actions to be taken depending on the relative amount of incentives between the two energy sources. Once the decision is made, the user identifies the specific equipment to be improved. The chart assists in narrowing down the search of equipment to be improved.

Furthermore, the chart as shown in FIG. 2 allows the user to probe the possibility of improvement in the specific unit via other unit performance. This inferred type feature should enable the user to see the interactive nature of the process equipment directly. For example, the HRSG (specific unit) is a steam generator that uses exhaust heat from the gas turbine as a heat source. Practically, the HRSG uses "free" fuel to generate steam, but if the performance of HRSG is poor at a given point in time, there will be a tendency for the backup boiler (other unit) to increase its fuel consumption for steam generation. Thus, in this case, the scope for process improvement can be inferred from other unit's "lower" performance to diagnose the specific unit actual poor performance. However, it is assumed that the performance of the backup unit (other unit) is originally at its optimum level.

Figure 4:
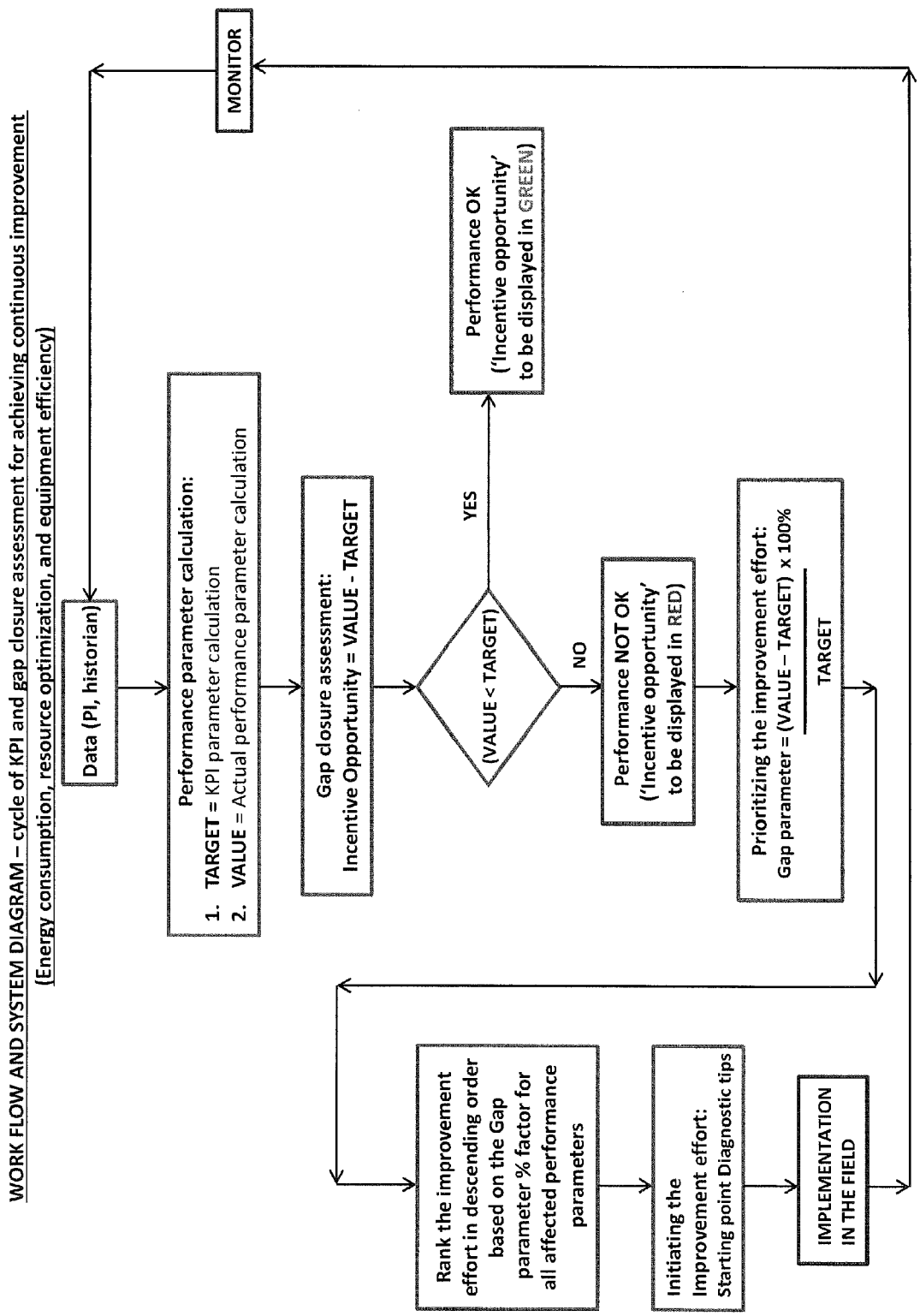
FIG. 4 shows a work flow and system diagram for a complete cycle of KPI and gap closure assessment for achieving continuous improvement according to an embodiment of this invention.
Figure 5:
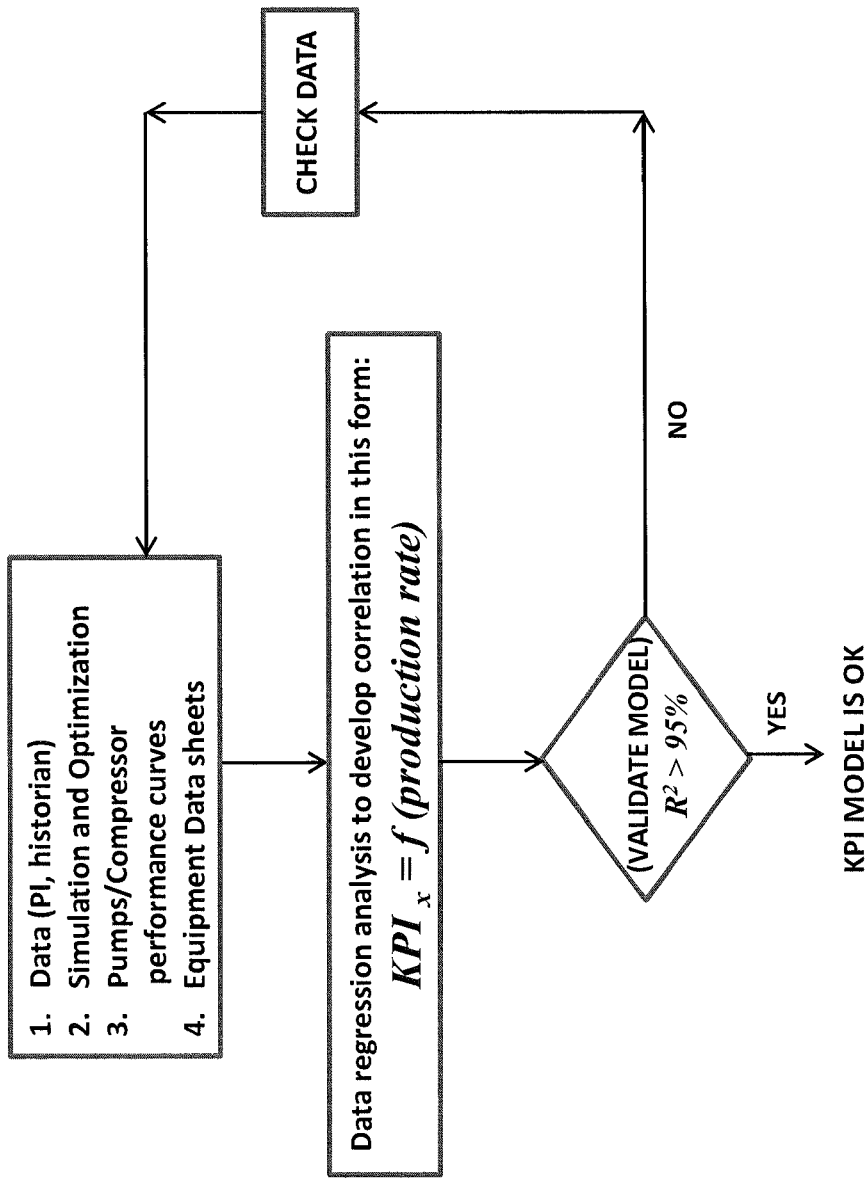
FIG. 5 shows a work flow and system diagram for KPI correlation and development according to an embodiment of the invention.

As shown in FIG. 4, a work flow and system diagram for assessing KPI and gap closure assessment is provided. Data is input into the system and a performance parameter calculation is performed. The target KPI parameter calculation is performed in accordance with the work flow and system diagram as shown in FIG. 5. After the target and actual performance parameter calculation are performed, a gap closure assessment is performed. For example, if the value is less than the target performance parameter, then a yes signal confirms that performance is acceptable and the incentive opportunity is displayed in green (or other accepted color). If the value is not less than the target, then a no signal confirms that performance is unacceptable and incentive opportunity is displayed in red (or other accepted color). In some embodiments, the following gap parameter equation is used to subsequently establish the relative comparison in the common denominator term (in this case % deviation) with other performance gaps from other performance metrics to prioritize the improvement effort:

$$\text{Gap parameter} = \frac{(\text{Value-Target})}{\text{Target}} \times 100\%$$

Therefore, the highest the gap parameter % for a specific performance metric in the performance gap list will be given the top priority to be improved at that point in time.

In some embodiments, the improvement effort is then ranked in descending order based on the gap parameter percentage for all affected performance parameters. After ranking, the improvement effort is initiated through the starting point diagnostic tips. The tips are implemented in the field and the process is monitored. The steps are then repeated until a yes signal indicating acceptable performance is produced.

Figure 6:
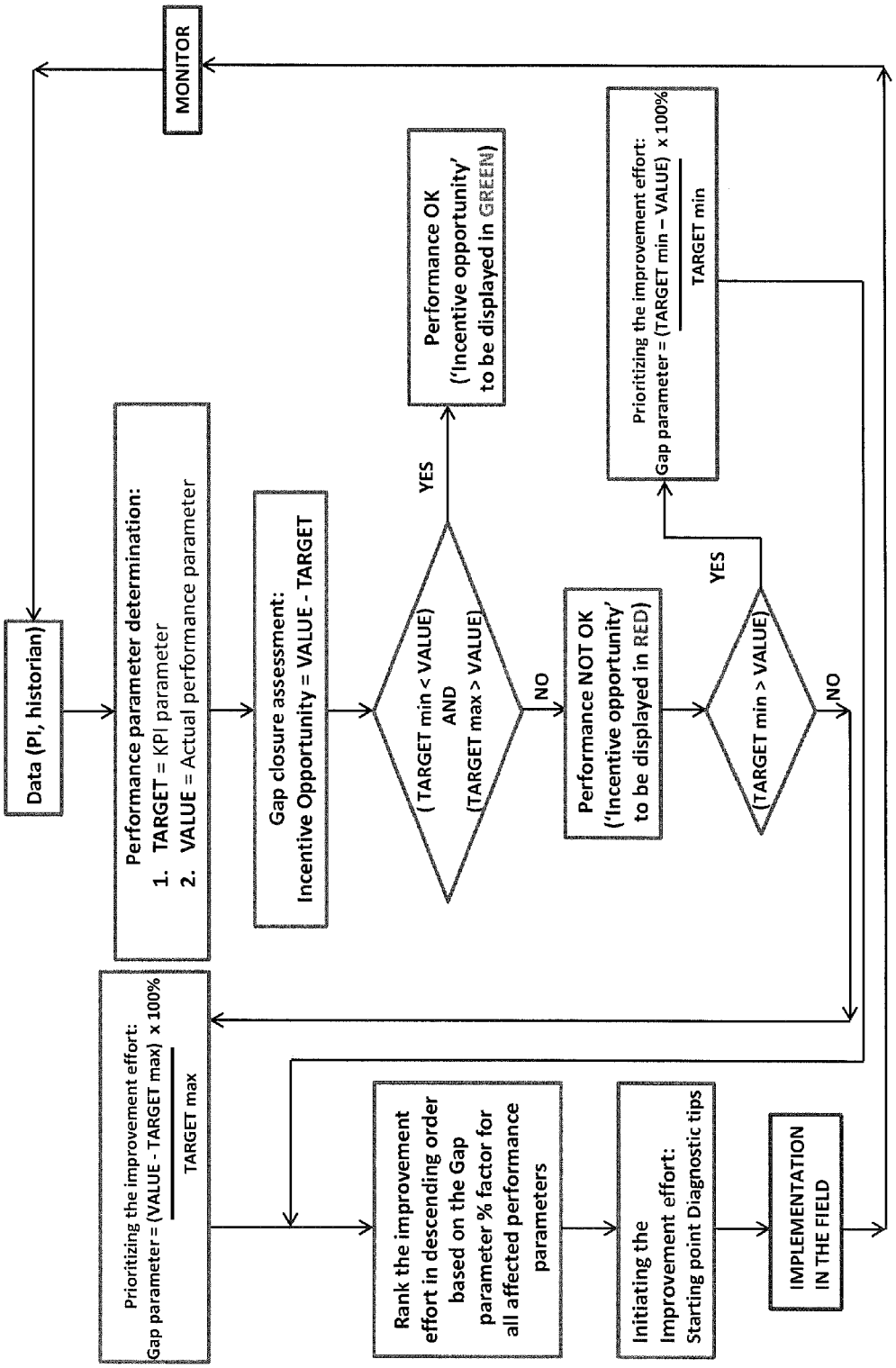
FIG. 6 shows a work flow and system diagram for a complete cycle of KPI and gap closure assessment for achieving continuous improvement according to an embodiment of the invention.

FIG. 6 demonstrates the general work flow diagram showing how the KPIs are analyzed during the gap closure assessment from the given data (PI or historian). This flowchart is applicable for energy consumption, equipment efficiency, and resource optimization performance monitoring, where the incentive for improvement in the gap closure assessment only occurs when the actual performance parameter exceeds its corresponding KPI or target parameter.

FIG. 5 shows an exemplary KPI correlation development Work Flow and System Diagram. Data can be collected, a simulation can be performed, pump and compressor performance curves can be analyzed, and equipment data sheets can be assessed. A data regression analysis can then be used to develop a correlation in the form of KPIx=f(production rate). The model is then validated by analyzing $R^2$. If $R^2$ is greater than 95%, then the KPI model is acceptable. If the $R^2$ is not greater than 95%, then the data is checked, and the process is repeated.

FIG. 5, illustrates the work flow diagram to determine the KPI correlation from various data. Namely, PI data, engineering specification sheets data, pumps and compressors performance curves, and process simulation data. It is worth highlighting that the work flow to determine the KPI in FIG. 5 only covers the energy consumption and equipment efficiency correlations as a function of production rates.

For example, a user can assess the wash water consumption target performance parameter. If one assumes that, in an exemplary system, the current value of the wash water consumption ratio is 2.37 vol %, while the target or KPI is set at 2.00 vol %, then the "Optimization Incentive" for this performance parameter is 0.37 vol % and it is indicated in red (or other accepted color) on the user interface. This indicates an opportunity to reduce the wash water consumption further by 0.37 vol %. The corresponding diagnostic tips to reduce the wash water consumption will be the starting point to implement the improvement initiative. Exemplary diagnostic tips for higher wash water consumption are: "Check for typical high salt content trunklines, if target is exceeded"; "Review demulsifier dosing requirement and performance"; "Check with Production Engineering for any latest salt analysis from each well"; and "Assess current wash water consumption performance based on the above list to justify higher than KPI target consumption."

With these starting point diagnostic tips in place, the user should be able to systematically assess the concern of higher wash water consumption and the user will remain focused on achieving the solution to the issue. In short, the tips should drive the user to close this gap effectively.

Another example relates to HP compressor power usage. Similarly, the same approach for analyzing the gap performance can be seen in energy consumption. In this example, the current HP compressor power consumption is 7850 kW and the KPI for this unit is 6192 kW. The "Optimization Incentive" or performance gap is 1658 kW and it is indicated on the user interface in red (or other accepted color). To close the gap, exemplary diagnostic tips provides the following actions to proceed for implementation: "Maximize individual compressor capacity and where appropriate, divert HP gas to other train's HP gas compressor"; "Check process performance at the affected compressors (e.g. inlet temperature and pressure, possible MW change) against the performance curve"; "Review discharge pressure requirement"; "Review spillback flow rate requirement to avoid surging by looking at the reliability of the recycle valve"; "Review control logic if required"; "Check for possible rotating equipment deficiency (e.g. seal leakage, vibration and frequency of maintenance activities)."

Again, similar to the example relating to wash water consumption, these tips to reduce power consumption in the HP compressor should drive the improvement effort effectively. The user can cross check the diagnostic tips to ensure that possible causes for higher power consumption have analyzed during the improvement activity.

On the other hand, the yield gain performance monitoring will be opposite to the one highlighted in FIG. 4. This is because it involves composition and product property specifications that influence the product yield gain. Practically, the crude product composition in particular has the element of acceptable product specification range that covers both maximum and minimum specifications. For example, if the actual composition specification is lower than the target (min), than this composition value has to be improved, i.e. to raise the composition value to the required target as a means to maximize yield. But if the actual composition exceeds the target value (max), the product is considered an off-specification product and this too has to be improved by reducing the actual composition value.

FIG. 6 shows an exemplary complete cycle of KPI and gap closure assessment for achieving continuous improvement in terms of Yield Gain. Data is input into the system and a performance parameter calculation is performed. The target KPI parameter calculation is performed in accordance with the work flow and system diagram as shown in FIG. 5. After the target and actual performance parameter calculation are performed, a gap closure assessment is performed to identify incentive opportunities (Actual performance value−KPI target value). If the value is less than the target, then a YES signal confirms that performance is acceptable and the incentive opportunity is displayed in green (or other accepted color). If the value is not less than the target, then a NO signal confirms that performance is unacceptable and incentive opportunity is displayed in red (or other accepted color). In some embodiments, the following gap parameter equation is used to subsequently establish the relative comparison in the common denominator term (in this case % deviation) with other performance gaps from other performance metrics to prioritize the improvement effort:

$$\text{Gap parameter} = \frac{(\text{Value-Target})}{\text{Target}} \times 100\%$$

Therefore, the highest the gap parameter % for a specific performance metric in the performance gap list will be given the top priority to be improved at that point in time.

The improvement effort is then ranked in descending order based on the gap parameter % factor for all affected performance parameters. After ranking, the improvement effort is initiated through the starting point diagnostic tips. The diagnostic tips are implemented in the field and the process is monitored. The steps are then repeated until a YES signal indicating acceptable performance is produced at the gap closure assessment step.

Figure 7:
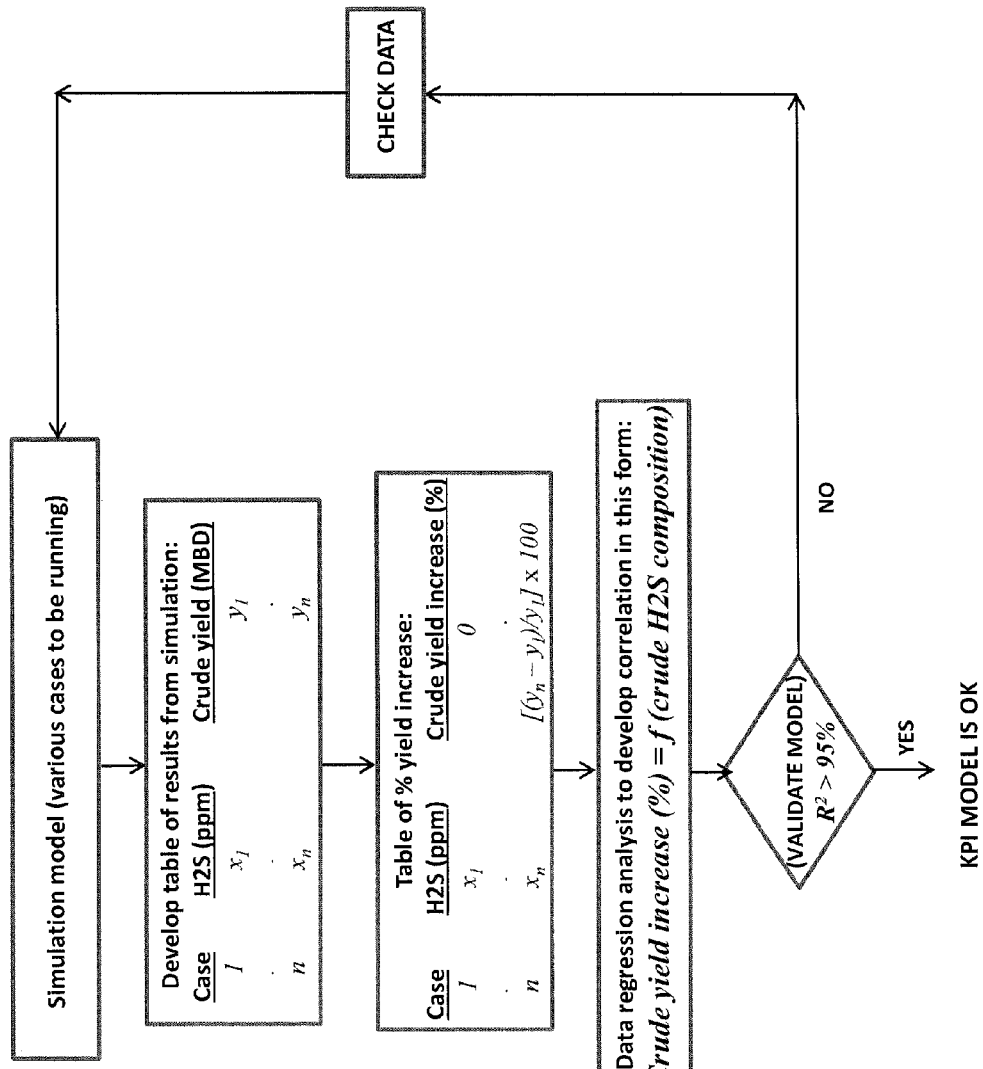
FIG. 7 shows a work flow and system diagram for KPI correlation development according to an embodiment of the invention.

FIG. 7 shows KPI correlation development for percentage increase in crude yield correlation compared to crude H2S composition. A simulation model (readily available on the market and likely already in place at standard GOSP facilities) runs a simulation and develops a table of results from the simulation detailing various H2S ppm concentrations and crude oil yield (MBD). From these simulation results, a table of % yield increase is generated. A data regression analysis is performed to develop a correlation in the following form:

Crude yield increase %=$f$(crude $H2S$ composition)

The model is then validated by analyzing $R^2$. If $R^2$ is greater than 95%, then the KPI model is acceptable. If the $R^2$ is not greater than 95%, then the data is checked, and the process is repeated.

Figure 8:
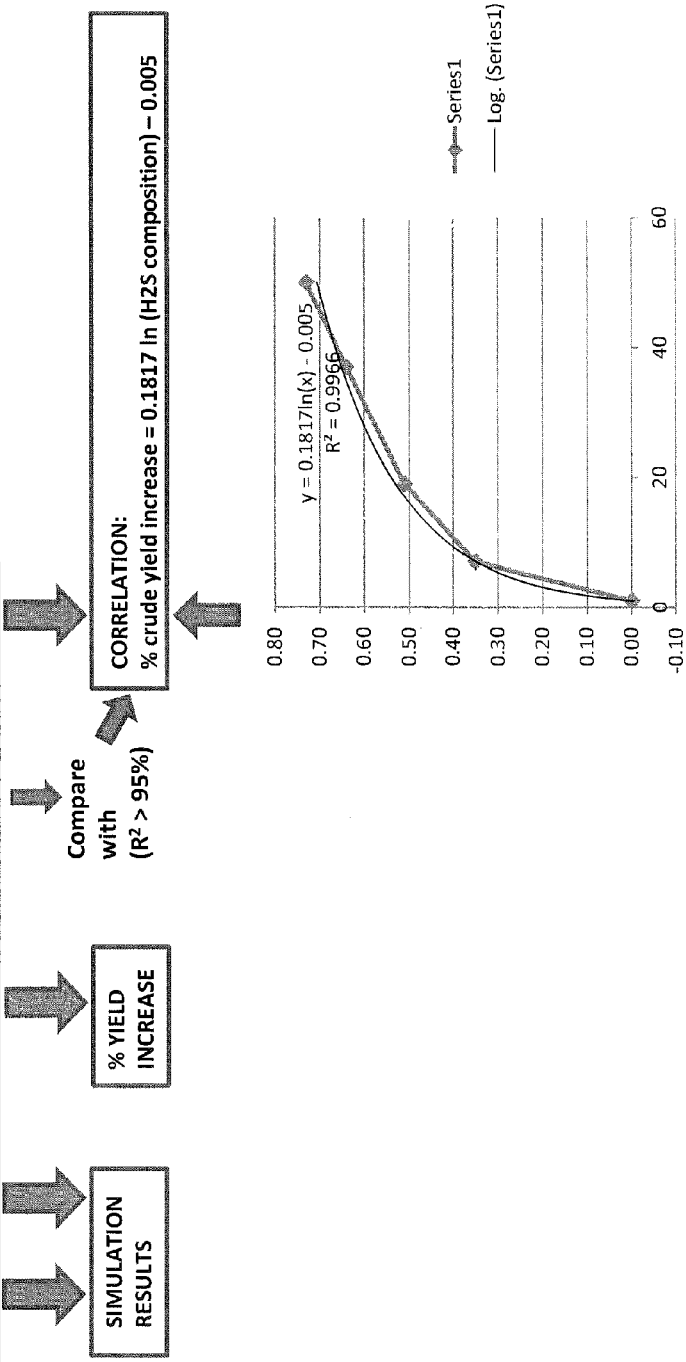
FIG. 8 shows a work flow and system diagram for KPI correlation development according to an embodiment of the invention.

FIG. 8 shows further details of the KPI correlation development for percentage increase in crude yield correlation compared to crude H2S composition as described in FIG. 7. As shown in FIG. 8, simulation results are used to calculate a % yield increase, which is then used to develop a correlation. In an exemplary embodiment, the correlation is shown in the graph and expressed as:

Percentage crude yield increase=0.817×ln($H2S$ composition in ppm)−0.005

FIG. 9 shows an exemplary screen shot of overall performance summary on a given day. As shown, the actual values and KPI targets are identified for a number of parameters. The incentive opportunities are also provided. The incentive is further shown in terms of monetary or energy savings. The bottom portion of the screen details high priority opportunities for growth. The overall performance summary provides the major key performance indicators of plant performance for the whole facility in a given day. In this snapshot, the critical performance parameters are the crude yield gains incentives from four oil trains (B32, B33, B34, B35), NGL yield gains from two gas trains, facility power and fuel saving incentives in terms of monetary values, facility energy consumption performance index, and the number of oil trains running.

When a user reviews the crude yield gain incentive for this particular day, it indicates that the incentive opportunity (gap closure) is in red showing an opportunity to recover more crude. The user who is assessing this opportunity may believe the amount to recover is too small and may not be justified (the amount shown is only around 0.02 MBD for B32). Additionally, for NGL yield gain, the gap closure or incentive opportunity is showing green, which indicates the performance is doing fine on that day.

As the user moves on to the next parameter, namely, the power and fuel saving incentives, and energy index, all the incentives or gap closure are showing red indicating improvement opportunities.

To make the user's assessment easier, the user can review the items for value creation opportunities (generated on the user interface in a top to least priority list). This table provides the user with the items that the user needs to focus on for that day. As shown, the top priority is to look at the total fuel consumption issue at the facility. As shown, the facility has consumed a significant amount of fuel for that day, and if this fuel can be reduced to its fuel consumption target, it will save the company's fuel value around $36 MM/year.

Knowing this improvement incentive, the user will review the corresponding diagnostic tips generated on the user interface. The user will note the area column indicates the practical working area of this particular KPI. Here, the total fuel consumption is categorized under the facility "Utilities." The next column is Optimization Incentive. This column indicates the particular optimization focus that the improvement will achieve. In this case, it will contribute to the energy optimization benefit. Finally, the corresponding diagnostic tips are provided to kick-off the improvement work with a four item check list for the user to start assessing.

Figure 10:
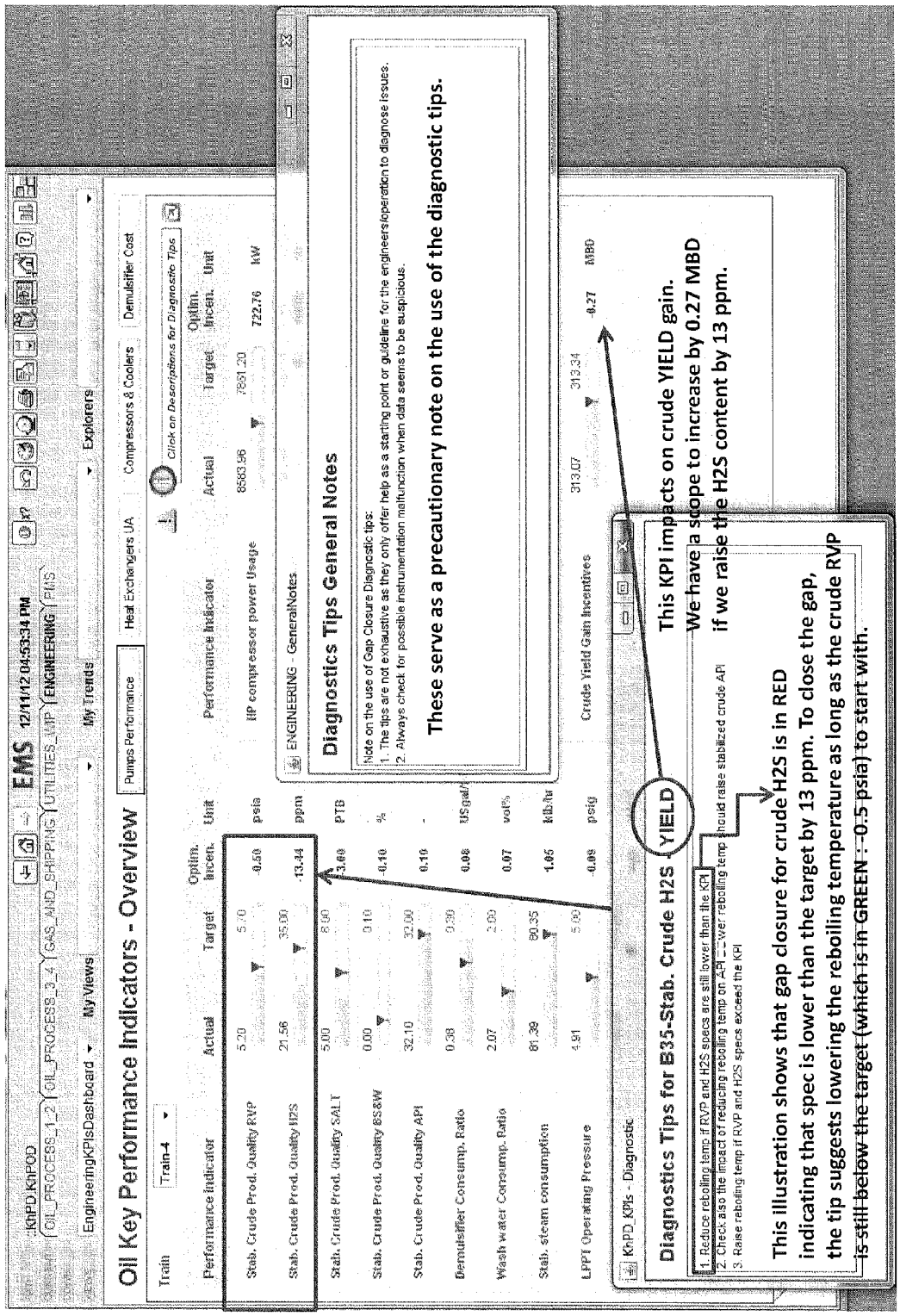
FIG. 10 shows an exemplary screen shot of a user interface according to an embodiment, detailing an oil train performance summary on a given day for an exemplary GOSP facility.

Ideally, once the assessment was made in the overall performance summary snapshot as in FIG. 9, the user should proceed with the individual process area assessment to evaluate the detail performance parameters for the particular processing area. FIG. 10 details the KPI monitoring for the particular processing area in Oil Train 4. To illustrate, the H2S content in the crude is much lower than the target by 13 ppm. The user clicks on this performance parameter [Stab crude Prod quality H2S] and displayed are the diagnostic tips corresponding to this KPI. Here it shows the actions to be taken to close the gap.

Exemplary Calculations

Embodiments of the invention not only focus on energy consumption and equipment efficiency, but also on yield gain and resource optimization. In some aspects of the invention, the yield gain focuses on both crude and NGL products, while the scope of resource optimization covers under wash water and demulsifier consumption in GOSP operation. Exemplary calculations relating to such embodiments are detailed below.

For example, the KPI for crude yield gain is derived, in the form of correlation, from the specific composition in the crude that is being monitored daily.

In some aspects, this invention includes a calculation to estimate the crude yield gain based on the stabilized crude H2S content. An exemplary correlation between the increase in crude yield and the H2S content in the stabilized crude can be expressed (as a single variable to estimate the crude yield gain):

$A$=0.1817×ln($H2S$ composition in ppm)−0.005

Actual performance rate at the current $H2S$ ppm ($MBD$)=(crude rate)×(1+$A$/100)

KPI performance rate at a $KPI$ $H2S$ target at 35 ppm ($MBD$)=(crude rate)×(1.00641)

These correlations assume that the H2S ppm and C3-C4 RVP specifications go hand in hand, as their boiling points are very close to each other. Hence, whichever comes first to the limit will dictate the crude specification, ultimately. In the case of particularly sour crude oil, H2S typically reaches the limit first even though RVP is still well below the maximum specification, partly because the crude is very sour. This yield gain correlation itself does not involve any other variables. The performance gap can then be calculated as follows:

Performance gap=$KPI$ performance rate($MBD$)−Actual performance rate($MBD$)

An example using these correlations is provided as follows. Assume the actual performance parameter at 28 MBD with H2S is 20 ppm. The target performance parameter is 35 ppm. How much crude gain improvement incentive is there to achieve the target performance parameter?

Crude rate at 20 ppm=280×(1+0.51/100)=281.43 $MBD$

Crude rate at 35 ppm=280×(1+0.64/100)=281.792 $MBD$

Crude gain incentive=281.792−281.43=0.36 $MBD$

It should be noted that in refinery or petrochemical plants, the correlations may be more complex than the one was developed above, as it normally relates to other composition parameters from various product streams, for example, in the refinery crude atmospheric tower.

A similar procedure can be used to estimate the NGL gain in NGL yield based on propane content in the NGL product using a gas train NGL yield correlation. In an exemplary correlation:

$$B = 0.0182 \times (C3 \text{ content in Vol \%})^2 + 0.4175 \times (C3 \text{ content in Vol \%}) - 14.043$$

$$\text{Actual performance at the current } C3 \text{ purity}(MBD) = NGL \text{ rate} \times (1 + B/100)$$

$$KPI \text{ performance rate at the } KPI \text{ } C3 \text{ purity target } (MBD) = NGL \text{ rate} \times (1.228645)$$

$$\text{Performance gap} = KPI \text{ performance rate}(MBD) - \text{Actual performance rate}(MBD)$$

By example, assume the actual performance parameter at 28 MBD with C3 content is 28 vol %. The target performance parameter is 35 vol % of C3 in NGL. How much additional NGL can be recovered is the target performance parameter is achieved?

$$NGL \text{ rate at } 28 \text{ vol \%} = 28 \times (1 + 11.92/100) = 31.33 \text{ } MBD$$

$$NGL \text{ rate at } 35 \text{ vol \%} = 28 \times (1 + 22.86/100) = 34.40 \text{ } MBD$$

$$NGL \text{ gain incentive} = 34.40 - 31.33 = 3.07 \text{ } MBD$$

System

Such a facility monitoring system can include, for example, a communications network, a plurality of client devices, and a database. The communications network can include a telephony network, a wireline network, a wireless network, a wide area network, a local area network, an infrared network, a radio-frequency network, an optical network, or any other communications network now or hereinafter created as is known and understood by those skilled in the art. Each of the client devices allows a human user, such as an operator or engineer, to interact with the facility monitoring system. Any human being can be a human user. Each of the client devices allows such a human user, for example, to select a performance parameter and review the deviations from the target performance parameters, improvement incentives associated with reducing the deviations from the target performance parameters, and reviewing diagnostic tips for improving the performance parameters, as is described herein.

In some embodiments, components are integrated into a web-based, multi-tier architecture that permits scalability and optimizes processing performance. XHQ connects to the back-end systems through the XHQ Connector Framework.

Figure 11:
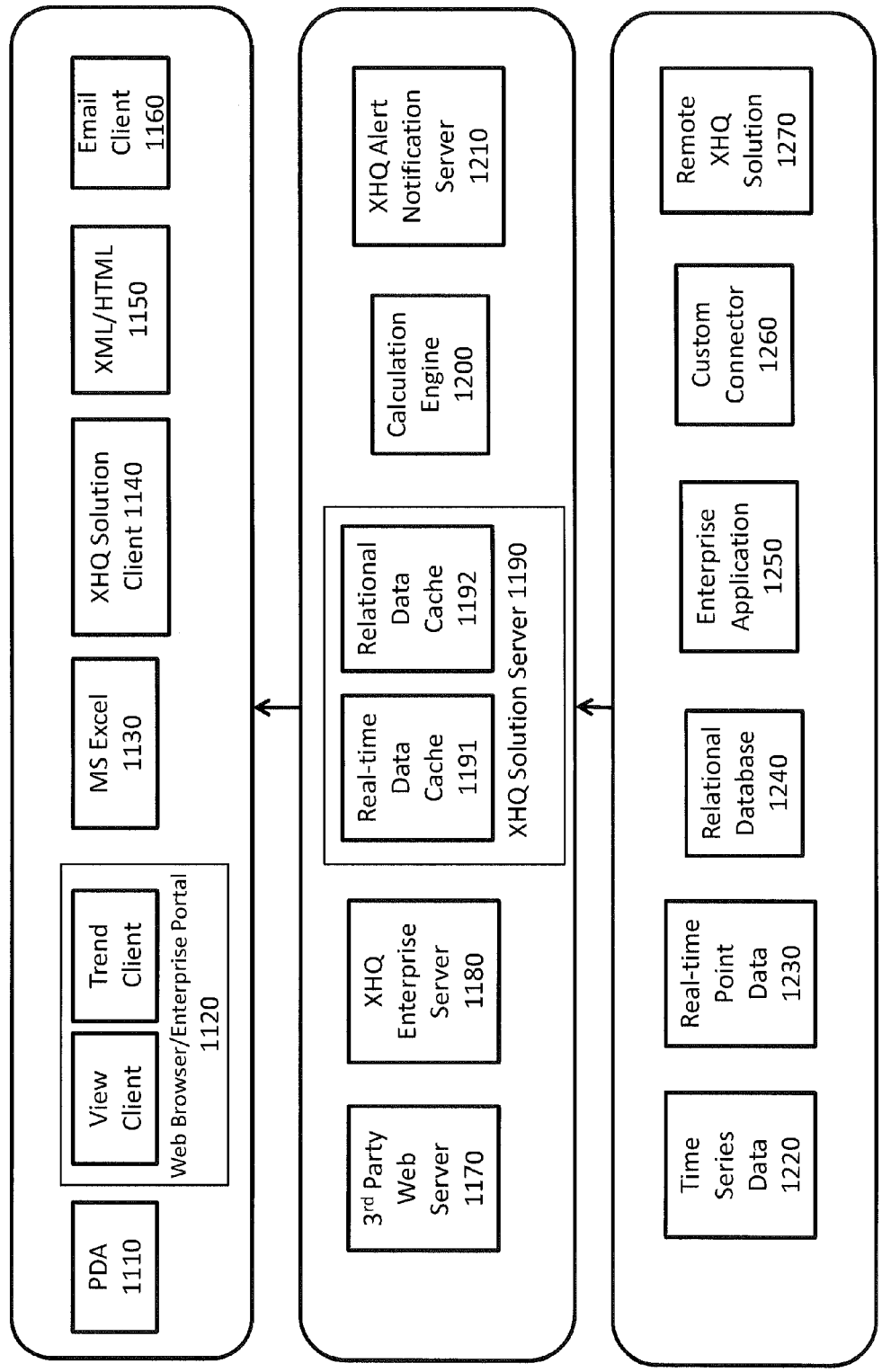
FIG. 11 shows an exemplary system architecture for an embodiment of the monitoring system.

FIG. 11 shows an embodiment of the logical connections between the data sources such as Plant Information (PI), the XHQ application, and end-users. The potential clients of embodiments of the system include PDA devices with Wifi capability 1110, Web Browsers/Enterprise Portals 1120, MS Excel Add-ins 1130, XHQ Solution clients 1140, XML/HTML 1150, and email clients 1160.

As shown in FIG. 11, XHQ servers 1180, 1190, 1210 are used to distribute functionality and to scale implementations. XHQ server 1180 is a XHQ Enterprise server. XHQ server 1190 is a XHQ Solution server with a real time data cache 1191 and a relational data cache 1192. XHQ server 1210 is a XHQ Alert Notification server. Third party server 1170 is also present in the system. Calculation engine 1200 serves as an engine for performing calculations for the system.

Connections between XHQ and back-end systems are vital. XHQ is designed to accept data from any current middleware or integration products that an enterprise might need. In this way, back-end systems 1220, 1230, 1240, 1250, 1260, and 1270 do not need modifications to facilitate their providing information into XHQ. The XHQ Connector Framework serves to abstract the data in back-end systems, ensuring that the type and styles or the access and protocols are not a concern to end users or the XHQ view developers. An XHQ connector can access at least three categories of data: Point data which includes single values from data acquisition services and automation systems; Collection data which are a set of values that are retrieved to meet the redefined parameters; and Time-series-based data from historical data systems or predictive data engines that store the changes in data values over time periods. XHQ can extract these types of data from relational database systems, from proprietary systems through dedicated APIs (application programmer interfaces), or through object interface mechanisms provided by CORBA and Microsoft DCOM. In the embodiment shown in FIG. 11, the back end operation systems include time series data 1220, Real time point data 1230, Relational Database 1240, Enterprise. Application 1250, customer connector 1260, and Remote XHQ solution 1270.

Each of the plurality of client devices can be, for example, any type of stationary or portable personal computing device such as a desktop computer, laptop computer, microcomputer, minicomputer, netbook computer, ultra-mobile computer, tablet computer, handheld computer, mobile telephone, personal digital assistant (PDA), so-called "smartphone," or any other computing device intended to be operated directly by an end user with no intervening computer operator as is known and understood by those skilled in the art. Each of the plurality of client devices can include, for example, a keyboard, a mouse, a graphical user interface device, a display, a microphone, electronic speakers, a modem, a LAN card, a computer graphics card, a printer, a scanner, a disk drive, a tape drive, a camera, a Wi-Fi card, a PCMCIA card, or any other peripheral device as is known and understood by those skilled in the art. If the producer computer is a mobile device, as is known and understood by those skilled in the art, the mobile device can include, but is not limited to, a cellphone device, a handheld device, a handheld computer, a palmtop, a handheld device, or any other mobile computing device. Such a mobile device can also include, for example, a display screen with a touch input user interface or a miniature keyboard, or a touch-screen interface. A PDA can include, for example, a processor, memory, an input device, and an output device. Additionally, a PDA, for instance, can include a palmtop computer, a smartphone, a palm device, a portable media player, a Wi-Fi enabled device, a global positioning system device, or any other handheld computing device now or hereinafter developed as is known and understood by those skilled in the art. Embodiments having one or more producer computers as a laptop computer include, for example, the Apple MacBook, MacBook Air, and MacBook Pro product families, the Dell Inspiron and Latitude product families, the Lenovo ThinkPad and IdeaPad product families, the Panasonic Toughbook product families, and the Toshiba Satellite product families. Examples of embodiments having one or more client devices as a smartphone include, for example, the iPhone series by Apple Computer, Inc. of Cupertino, Calif. and the Droid by Motorola, Inc. of Schaumburg, Ill.

The client device can include a graphical user interface device. The graphical user interface device can include, for example, a CRT monitor, a LCD monitor, a LED monitor, a plasma monitor, an OLED screen, a television, a DLP monitor, a video projection, a three-dimensional projection, a holograph, a touch screen, or any other type of user interface which allows the one of the plurality of users to interact with one of the plurality of client devices using images as is known and understood by those skilled in the art.

According to various exemplary embodiments of the present invention, the database can be any database structure as is known and understood by those skilled in the art. The databases discussed herein, can be, for example, any sort of organized collection of data in digital form. Databases can include the database structure as well as the computer programs that provide database services to other computer programs or computers, as defined by the client-server model, and any computer dedicated to running such computer programs (i.e., a database server). An exemplary database model, for example, is Microsoft SQL Server 2008 R2. Databases can include a database management system (DBMS) consisting of software that operates the database, provides storage, access, security, backup and other facilities. DBMS can support multiple query languages, including, for example, SQL, XQuery, OQL, LINQ, JDOQL, and JPAQL. Databases can implement any known database model or database models, including, for example, a relational model, a hierarchical model, a network model, or an object-oriented model. The DBMS can include Data Definition Language (DDL) for defining the structure of the database, Data Control Language (DCL) for defining security/access controls, and Data Manipulation Language (DML) for querying and updating data. The DBMS can further include interface drivers, which are code libraries that provide methods to prepare statements, execute statements, fetch results, etc. Examples of interface drivers include ODBC, JDBC, MySQL/PHP, FireBird/Python. DBMS can further include a SQL engine to interpret and execute the DDL, DCL, and DML statements, which includes a compiler, optimizer, and executor. DBMS can further include engine a transaction engine to ensure that multiple SQL statements either succeed or fail as a group, according to application dictates. DBMS can further include a relational engine to implement relational objects such as Table, Index, and Referential integrity constraints. DBMS can further include a storage engine to store and retrieve data from secondary storage, as well as managing transaction commit and rollback, backup and recovery, etc.

Data stored in fields of the databases can be updated as needed, for example, by a user with administrative access to the database to add new data to the libraries in the database as they become supported. It will be appreciated by those having skill in the art that data described herein as being stored in the databases can also be stored or maintained in non-transitory memory and accessed among subroutines, functions, modules, objects, program products, or processes for example, according to objects and/or variables of such subroutines, functions, modules, objects, program products or processes. Any of the fields of the records, tables, libraries, and so on of the database can be multi-dimensional structures resembling an array or matrix and can include values or references to other fields, records, tables, or libraries. Any of the foregoing fields can contain either actual values or a link, a join, a reference, or a pointer to other local or remote sources for such values.

The database can be, for example, a single database, multiple databases, or a virtual database, including data from multiple sources, for example, servers on the World Wide Web. According to various exemplary embodiments of the present invention, for example, the database can include a plurality of databases. An exemplary database is the performance parameters database which can be configured, for example, to store any data related to performance parameters, including target parameters and historical actual parameters, and any other information related to a GOSP facility, as is known and understood by those skilled in the art.

As used herein, the processor can include, for example, one or more microprocessors, microcontrollers, and other analog or digital circuit components configured to perform the functions described herein. The processor is the "brains" of the respective computer and as such, can execute computer program product or products.

The processor can be any commercially available terminal processor, or plurality of terminal processors, adapted for use in or with the GOSP monitoring system. The processor can be, for example, the Intel® Xeon® multicore terminal processors, Intel® micro-architecture Nehalem, and AMD Opteron™ multicore terminal processors, Intel® Core® multicore processors, Intel® Core 2 Duo® multicore processors, and other processors with single or multiple cores as is known and understood by those skilled in the art. The processor can be operated by operating system software installed on memory, such as Windows Vista, Windows 7, Windows XP, UNIX or UNIX-like family of systems, including BSD and GNU/Linux, and Mac OS X. The processor can also be, for example the TI OMAP 3430, Arm Cortex A8, Samsung S5PC100, or Apple A4. The operating system for the processor can further be, for example, the Symbian OS, Apple iOS, Blackberry OS, Android, Microsoft Windows CE, Microsoft Phone 7, or PalmOS.

The GOSP monitoring system can further include a non-transitory memory or more than one non-transitory memories (referred to as memory herein). The memory can be configured, for example, to store data, including computer program product or products, which include instructions for execution on the processor. The memory can include, for example, both non-volatile memory, e.g., hard disks, flash memory, optical disks, and the like, and volatile memory, e.g., SRAM, DRAM, and SDRAM as required to support embodiments of the instant invention. As one skilled in the art will appreciate, the memory can be a motherboard or a separate component or device, e.g., flash memory. As one skilled in the art will understand, the program product or products, along with one or more databases, data libraries, data tables, data fields, or other data records can be stored either in memory or in separate memory (also non-transitory), for example, associated with a storage medium such as a database (not pictured) locally accessible.

The memory can further include applications, drivers, modules, libraries, or engines that allow for interactive client-side interface capabilities, including, for example a web browser application, such as Microsoft® Internet Explorer® by Microsoft Corporation of Redmond, Wash., having capabilities for processing interactive content, such as Java, JavaScript, or Flash plug-ins or scripts. Those having skill in the art will appreciate that interactive interfaces, such as the performance parameters interface, diagnostic tips interface, and the improvement incentives interface can be in whole or in part dynamically generated at a server computer, and delivered to the client device in static mark-up language, such as HTML, for display at the client device using the web browser and a display peripheral device.

The communications network can include, for example, any public or private network communication paths to support the communications sent and received between the client device and the processor computer, including the public Internet, a private intranet, a virtual private network (VPN) tunneled across the public Intranet, for example, using a network security protocol, such as Netscape's Secure Socket Layer (SSL) protocol. The communications network can be, for example, a telecommunication network including a wire-based telephone network, pager network, cellular network, or a combination thereof, and a computer network. Accordingly, the communications network can be implemented, in whole or in part, over wireless communications network. In addition, according to various exemplary embodiments of the present invention, the wireless communications network can be implemented over any of various wireless communication technologies, for example: code division multiplexed access ("CDMA"), time division multiplexed access ("TDMA"), frequency division multiplexed access ("FDMA"), orthogonal frequency division multiplexed access ("OFDMA"), global system for mobile communications ("GSM"), Analog Advanced Mobile Phone System ("AMPS"), Universal Mobile Telecommunications System ("UMTS"), 802.11a/b/g/n ("WiFi"), World Interoperability for Microwave Access ("WiMAX"), or Bluetooth.

According to various exemplary embodiments of the present invention, the server can include any type of mainframe, physical appliance, or personal computing device such as rack server, mainframe, desktop computer, or laptop computer, dedicated in whole or in part to running one or more services to serve the needs or requests of client programs which may or may not be running on the same computer.

The client device can be in communication with the database, either locally through a private LAN connection, or through a communications network. The database can contain, for example, tables, libraries, or other data structures for performance parameters. The performance parameters can include real time actual operating parameters, historical operating parameters, averaged operating parameters, and any combination thereof. The database can be, for example, a Microsoft SQL server providing database services as an enterprise-class server that providing reliable capabilities when used to support web applications. Microsoft SQL can store, for example, all data required by the aggregator module for administration, session state, membership, and application support.

In summary, embodiments of the invention bring the following value creations: facilitate daily monitoring activities with ease; integrate various calculations and data gathering steps to allow for quick and accurate performance assessment; simplify troubleshooting activities and provide direct suggested actions, benefits or incentives in quantified form; focus oriented improvement effort; diagnostic tips serve as good starting point so as to avoid inefficient "shooting in the dark" problem solving; concerted effort by the Operation, Maintenance and Engineering (OME) team to solve the problem; ease of reporting; accelerate knowledge transfer and/or training of inexperienced users; provide individual accountability; and set responsibility to ensure optimum performance operation.

The system and method of this invention allows for solving these problems in an integrated, systematic way by providing effective monitoring capabilities that have values and actions associated with results.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

That which is claimed is:

1. A Gas Oil Separation Plant (GOSP) facility monitoring system for assessing deviations from target performance parameters by comparing actual performance parameters to target performance parameters, and notifying the user of improvement incentives and diagnostic tips to improve performance and reduce the deviations, the GOSP facility monitoring system comprising:
   one or more client devices;
   one or more processors;
   non-transitory memory positioned in communication with the one or more processors to store computer program product therein;
   an input/output unit connected to the one or more processors and the non-transitory memory, the input/output unit adapted to be in communication with a plurality of back end operational systems through a network to receive a plurality of performance parameters from the plurality of back end operational systems;
   one or more key performance indicator databases to associate target performance values to operational units;
   a computer program product, defining an aggregator module, stored in the non-transitory memory and operable on the one or more processors, the aggregator module having a set of instructions that, when executed by the one or more processors, cause the GOSP facility monitoring system to perform the following operations:
      determining a plurality of deviations from target performance parameters, the deviations being determined by comparing actual performance parameters to target performance parameters;
      generating a list of deviations from target performance parameters;
      generating a summary of improvement incentives based on the deviation from a target performance parameter, the improvement incentives including financial improvement, yield improvement, or resource usage optimization; and
      generating a user interface to display at one or more client devices, the user interface allowing a user to monitor the performance parameters of the GOSP facility, the user interface including a performance parameters interface, improvement incentive interface, and diagnostic tips interface.

2. The GOSP facility monitoring system of claim 1, wherein the user interface allows the selection of a performance parameter to be improved and generates a display of the financial improvement to be gained by improving the performance parameter to be improved.

3. The GOSP facility monitoring system of claim 1, wherein the user interface allows the selection of a performance parameter to be improved and generates a display of the yield improvement to be gained by improving the performance parameter to be improved.

4. The GOSP facility monitoring system of claim 1, wherein the user interface allows the selection of a performance parameter to be improved and generates a display of the resource usage improvement to be gained by improving the performance parameter to be improved.

5. The GOSP facility monitoring system of claim 1, wherein the plurality of deviations from target performance parameters are determined based on a percentage deviation.

6. The GOSP facility monitoring system of claim 1, wherein the plurality of deviations from target performance parameters are ranked in a priority order.

7. The GOSP facility monitoring system of claim 6, wherein the ranking in a priority order is based on the percentage deviation.

8. The GOSP facility monitoring system of claim 6, wherein the ranking in a priority order is based on the financial improvement to be gained by reducing the deviation from target performance parameter.

9. The GOSP facility monitoring system of claim 6, wherein the ranking in a priority order is based on the yield improvement to be gained by reducing the deviation from target performance parameter.

10. The GOSP facility monitoring system of claim 1, wherein the user interface allows the selection of a performance parameter to be improved and generates a list of diagnostic tips to aid the user in improving the performance parameter to be improved.

11. A method of using the facility monitoring system of claim 1, comprising the steps of:
    a user monitoring the user interface;
    the user interface displaying an improvement opportunity based on a deviation from a target performance parameter; and
    the user interface displaying diagnostic tips to reduce the deviation from the target performance parameter.

12. The method of claim 11, further wherein the user takes action based on the diagnostic tips provided and reduces the deviation from a target performance parameter.

13. The method of claim 11, further comprising the step of:
    the user interface displaying an improvement incentive in terms of financial gain, yield gain, or resource usage optimization.

14. The method of claim 11, further comprising the step of:
    the user interface displaying a plurality of improvement opportunities based on deviations from target performance parameters; and
    the user interface displaying a priority list of parameters for the user to address based on a priority order of the improvement opportunities based on percentage deviations from target performance parameters.

15. A computer storage medium having a computer program stored therein including a set of instructions that when executed by one or more processors cause the one or more processors to perform a Gas Oil Separation Plant (GOSP) facility operations of:
    determining a plurality of deviations from target performance parameters, the deviations being determined by comparing actual performance parameters to target performance parameters;
    generating a list of deviations from target performance parameters;
    determining a priority order for the plurality of deviations from target performance parameters;
    generating a summary of improvement incentives based on the deviations from target performance parameters, the improvement incentives including financial improvement, yield improvement, or resource usage optimization; and
    generating a user interface to display at one or more client devices, the user interface allowing a user to monitor the performance parameters of the GOSP facility;
    generating a list of diagnostic tips for addressing the deviations from target performance parameters in the determined priority order.

16. The computer storage medium as defined in claim 15, wherein the plurality of deviations from target performance parameters are ranked in a priority order.

17. The computer storage medium as defined in claim 16, wherein the ranking in a priority order is based on the percentage deviation.

18. The computer storage medium as defined in claim 16, wherein the ranking in a priority order is based on the financial improvement to be gained by reducing the deviation from target performance parameter.

19. The computer storage medium as defined in claim 16, wherein the ranking in a priority order is based on the yield improvement to be gained by reducing the deviation from target performance parameter.

20. The computer storage medium as defined in claim 16, wherein the ranking in a priority order is based on resource usage improvement to be gained by improving the performance parameter to be improved.

* * * * *